United States Patent
Fey et al.

(10) Patent No.: US 8,991,733 B2
(45) Date of Patent: Mar. 31, 2015

(54) PULPER

(75) Inventors: Jürgen Fey, Ravensburg (DE); Gerd Gottschalk, Ravensburg (DE); Werner Brettschneider, Ravensburg (DE); Elmar Ott, Ravensburg (DE)

(73) Assignee: Voith Patent GmbH, Heidenheim (DE)

( * ) Notice: Subject to any disclaimer, the term of this patent is extended or adjusted under 35 U.S.C. 154(b) by 427 days.

(21) Appl. No.: 13/446,402

(22) Filed: Apr. 13, 2012

(65) Prior Publication Data

US 2013/0099035 A1    Apr. 25, 2013

Related U.S. Application Data

(63) Continuation of application No. PCT/EP2010/060113, filed on Jul. 14, 2010.

(30) Foreign Application Priority Data

Oct. 13, 2009  (DE) .......................... 10 2009 045 613

(51) Int. Cl.
  B02C 21/00    (2006.01)
  D21B 1/34     (2006.01)
  D21D 5/04     (2006.01)
  D21D 5/16     (2006.01)

(52) U.S. Cl.
  CPC  D21B 1/345 (2013.01); D21D 5/04 (2013.01); D21D 5/16 (2013.01)
  USPC ........................................................ 241/46.17

(58) Field of Classification Search
  USPC ....................... 241/46.17, 69, 46.11
  See application file for complete search history.

(56) References Cited

U.S. PATENT DOCUMENTS

| | | | | |
|---|---|---|---|---|
| 257,252 A | * | 5/1882 | Strasser | 241/69 |
| 2,033,123 A | * | 3/1936 | Ciwles | 241/21 |
| 3,981,456 A | * | 9/1976 | Hahn et al. | 241/46.012 |
| 4,408,724 A | * | 10/1983 | Meyer | 241/46.17 |
| 5,379,951 A | * | 1/1995 | Hughes | 241/60 |

(Continued)

FOREIGN PATENT DOCUMENTS

| | | |
|---|---|---|
| DE | 23 45 735 A1 | 3/1975 |
| DE | 195 47 585 A1 | 12/1996 |
| DE | 101 16 367 A1 | 10/2002 |
| EP | 1 679 403 A1 | 10/2005 |
| EP | 1 693 505 A1 | 8/2006 |
| WO | 03/033152 A1 | 4/2003 |

OTHER PUBLICATIONS

International Search Report dated Apr. 12, 2011 for International Patent Application No. PCT/EP2010/060113 (11 pages).

*Primary Examiner* — Faye Francis
(74) *Attorney, Agent, or Firm* — Taylor IP, P.C.

(57) ABSTRACT

A pulper for comminuting and suspending fibrous material includes a container and at least one rotor arranged in the container for circulating a fibrous material suspension located on the container and at least one rigid sieve. The rotor at least predominantly passes over the sieve surface which is provided with round sieve openings. As high a throughput as possible and as low an energy consumption as possible are to be achieved by limiting the cross-section of the sieve openings exclusively defined by circle segments.

25 Claims, 4 Drawing Sheets

(56) References Cited

U.S. PATENT DOCUMENTS

| | | | | |
|---|---|---|---|---|
| 5,665,207 A | * | 9/1997 | Aikawa | 162/261 |
| 6,194,564 B1 | * | 2/2001 | Murofushi et al. | 536/114 |
| 6,234,415 B1 | | 5/2001 | Liin | |
| 2006/0243835 A1 | * | 11/2006 | Shimizu | 241/69 |
| 2008/0099591 A1 | * | 5/2008 | Cerra et al. | 241/69 |
| 2013/0305969 A1 | * | 11/2013 | Trebucchi et al. | 110/222 |

\* cited by examiner

-- Prior Art --

-- Prior Art --

PULPER

CROSS REFERENCE TO RELATED APPLICATIONS

This is a continuation of PCT application No. PCT/EP2010/060113, entitled "PULPER", filed Jul. 14, 2010, which is incorporated herein by reference.

BACKGROUND OF THE INVENTION

1. Field of the Invention

The present invention relates to a pulper for comminuting and suspending fibrous material, including a vat and at least one rotor arranged in the vat for circulating a fibrous material suspension located in the vat, as well as at least one rigid screen, wherein the rotor passes over at least the greatest portion of the screen surface which is provided with round screen openings.

2. Description of the Related Art

Pulpers of this type are predominantly used to bring dry pulp or recovered paper of greatly different compositions into suspension. They consist substantially of a vat for the suspension and at least one rotor. The furnished material—loose in large pieces, bales or pressed bales—is intensively mixed with water, whereby a hydraulic stock circulation is produced. Understandably such devices are optimized, whereby essentially fast and energy efficient pulping is strived for. In many cases the rotor is located in close proximity to a flat screen, thus keeping it free of clogging. The pulped stock is sorted from coarse contaminants through the screen openings and is drawn off as a suspension.

A vertically positioned cylindrical vat with a rotor in the floor area has prevailed as a standard for a pulper. In this vat, water and the stock to be pulped are added from the top and, with the assistance of the rotor a funnel, flow is produced in the suspension, whereby therefore the stock is drawn downward by the rotor and is pushed radially outward in the floor region, resulting in the rotational flow.

An additional typical design is the pulper vat which is open on top and has a side-mounted rotor. In this case the suspension is moved approximately horizontally to the rotor and diverted on the sidewall of the vat on which the rotor is mounted. This hydraulically often less favorable form has the advantage to be able to be accommodated under the paper machine as a broke pulper.

The aforementioned screen serves initially to undertake a separation whereby already sufficiently degraded portions of the paper stock are drawn off through the screen openings, and still insufficiently degraded stock is held back. This makes the pulping process more economical in a known method. If desired, the pulper may in particular be operated continuously. Contaminants, namely essentially non-paper components are held back or respectively sorted.

In many cases however, the screen also contributes to strengthening the pulping process. The side of the rotor facing the screen plate interacts with the inlet edges of the screen openings. A certain distance between rotor and screen plate is always maintained, however the shear forces occurring hereby are sufficient to degrade the paper stock particles further. Larger pieces can also bridge the distance between screen and rotor, so that a direct cutting action occurs. In what form and intensity these processes occur depends on the requirements and the design of the pulper. It is also known that the just described pulping action can be further strengthened in that the screen plates on the infeed side are equipped with bars, as known for example from DE 101 16 367.

A screen plate is known from WO 03/033152 A1 whose openings were produced by laser or water jet. These openings are not round, but are provided with corners and are distributed preferably in a mosaic-like pattern on the screen plate. This is intended to strengthen the pulping action. The known screens for pulpers of this type are usually provided with circular bores, or as described in EP 1679403 with elongated screen openings, whereby a compromise must be found between the demand for optimum classification, namely sorting openings which are as small as possible, and the requirement of an as high as possible throughput, in other words an as open as possible surface. The characteristic of such a screen results essentially from size, shape and number of screen openings disposed therein.

In addition to a high throughput, high resistance against the hydraulic pressure is also strived for. In order to meet this requirement, DE19547585 suggests a screen with a supporting- and sorting layer. However, the screen openings remain problematic, in particular to the production, throughput and risk of clogging.

What is needed in the art is a pulper having a high throughput at an as low as possible energy consumption and an as large and effective cutting edge length as possible.

SUMMARY OF THE INVENTION

The present invention provides a pulper having a screen such that the cross section of the screen openings is solely defined by circle segments, whereby the radii should exhibit a tangential transition and differ in regard to radius of curvature and/or direction of curvature. The round design of the screen openings has a positive effect on production using a laser cutter, since here no speed change is necessary as is otherwise required when cutting corners. Moreover, the exclusively round edges of the screen opening improve the action of the rotor when it passes over the openings.

The pulper according to the present invention further provides a reduced risk of clogging and the possibility of optimization in regard to open surface and rigidity of the screen.

The segments of the circles should hereby differ in length and/or radii, whereby long and short circle segments or respectively large and small radii may alternate, and further long, for example same size, circle segments have large radii and short, for example same size, circle segments have small radii.

Studies concerning this have shown that an optimum relationship between the largest and the smallest radius of the circle segments is to be found between approximately 3 and 20, for example between approximately 5 and 15. In most cases, the smallest radius of the circle segments may be between approximately 1.5 and 3 millimeters (mm) and/or the largest radius of the circle segments is between approximately 10 and 30 mm. Moreover, the number of circle segments of the cross section of the screen openings should be at least 4 and at most 10.

In accordance with the demands put upon the pulper or respectively its construction, as well as the quality or composition of the fibrous stock suspension all of the screen openings on the screen surface may be the same shape.

However, in order to influence the stability of the screen and/or its characteristic, the screen openings on the screen surface may have different cross sectional shapes or if the screen openings on the screen surface have the same cross sectional shapes the screen openings may be of different sizes.

For the same reason, a plurality, for example all, circle segments of a screen opening may progress convexly curved relative to the center of the cross section, or at least one circle segment may be concavely curved. If the inventive pulper is in the embodiment of the latter case, two circle segments of a screen opening which are located, for example, opposite each other, may progress concavely curved relative to the center of the cross section of the screen opening.

In order to increase the throughput at mostly the same screen count, the screen openings may have an elongated cross section. For optimum use of the screen surface the screen openings of a screen surface may be oriented the same, or also differently, for example depending upon their cross sectional shape. With many cross sectional shapes, in the case of different orientation, adjacent screen openings may be arranged offset by approximately 90° or 180° to each other. Moreover, clogging can be countered if the cross section of a screen opening enlarges continuously in a flow direction of the fibrous stock suspension.

Pulpers in this context are understood to also be secondary pulpers, for example fiberizers.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
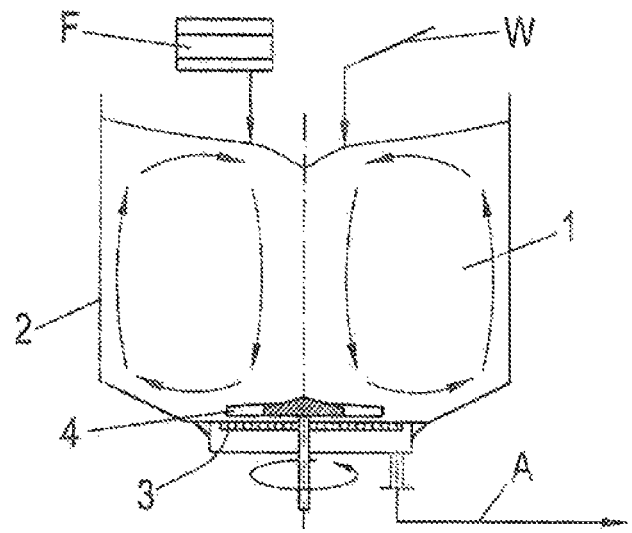
FIG. 1 is a cross section through an upright pulper.

The most common form of a pulper in which the invention may be applied is the upright cylindrical pulper which is open on top, according to FIG. 1, wherein screen 3 and rotor 4 are located in the floor area. During operation, paper stock F and water W are supplied into vat 2. The ready pumpable fibrous stock suspension 1 is drawn off through screen 3 as accepts A. Pulpers of this type have been known for a long time.

Figure 2:
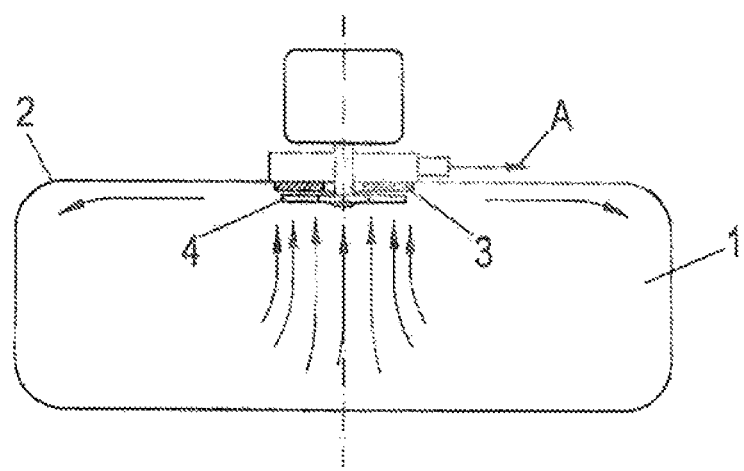
FIG. 2 is a cross section through horizontally positioned pulper.

The same also applies to pulpers according to FIG. 2. As already mentioned a horizontally positioned vat 2 of this type may be utilized underneath a paper machine for broke pulping. Another application is the secondary pulper, for example according to DE-A-23 45 735, whose screen plate is equipped with screen openings are constructed according to the present invention.

All embodiments of the present invention have in common that the greatest portion of the screen surface of the rigid and circular screen 3 is passed over by rotor 4 or respectively its vanes, wherein rotor 4 rotates in front of screen 3 in a flow direction of fibrous stock suspension 1.

Figure 3:
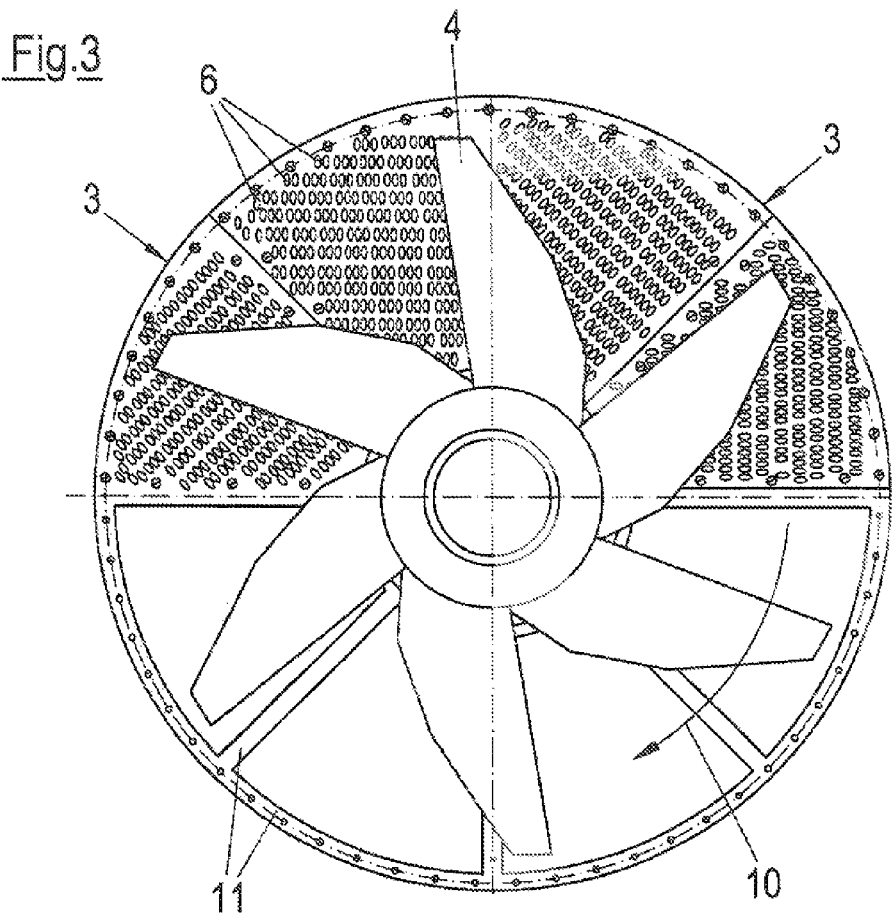
FIG. 3 is a top view onto a screen 3 with rotor 4.

Referring now to FIG. 3 there is shown a rotor 4 arranged concentrically with annular flat screen 3 in the pulper which other than this is not illustrated here. Rotor 4 is provided with vanes and is dimensioned so that during rotation 10 it passes over the surface of screen 3 in its entirety or at least over the greatest portion thereof. According to the present invention, the cross section of screen openings 6 of screen 3 is solely defined by circle segments, wherein at least two circle segments have different radii 7, 8, 9.

On larger screens 3 it is common to initially produce these as annular segments which are then assembled in the pulper to complete screen 3. In the example shown here, complete screen 3 consists of a total of eight segments, four of which are drawn here. The screen segments can be mounted to subjacent support frame 11.

Figure 4:
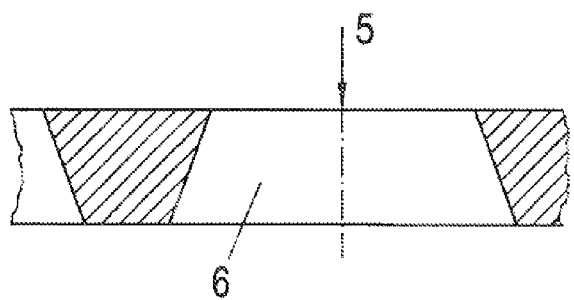
FIG. 4 is a partial cross section through a screen 3.

As illustrated in FIG. 4, the cross section of screen opening 6 should enlarge continuously in flow direction 5, thereby countering clogging of screen openings 6. As in laser cutting, the production of screen opening 6 with the inventive cross sectional shape as well as cross sectional changes hereby presents no problems. On the contrary, with missing corners the cutting tool can be moved more evenly along the contours to be cut.

Figure 5:
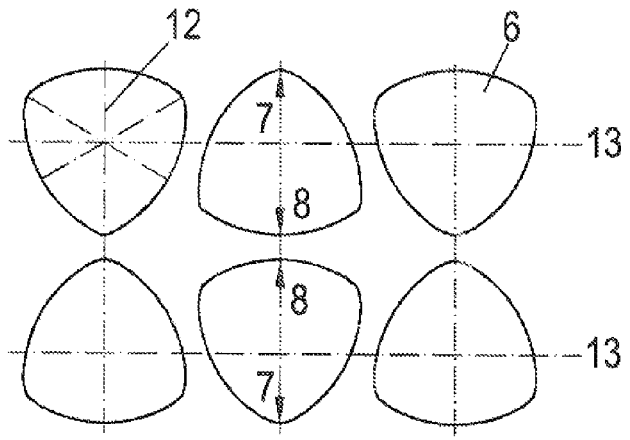
FIGS. 5 through 11 illustrate various screen openings 6.

Screen opening 6 shown in FIG. 5 is formed by three long circle segments of the same size with large 8 radius and three short circle segments of the same size with small 7 radius, whereby a short circle segment with small radius 7 follows a long circle segment with large radius 8. The cross section formed by these circle segments of screen opening 6 possesses three axes of symmetry 12.

The screen surface is hereby formed by several, in this case parallel rows of adjacently arranged screen openings 6, whereby adjacent screen openings 6 are arranged offset to each other by approximately 180° and axis of symmetry 12 of screen opening 6 respectively progresses perpendicular to orientation 13 of the appropriate row. For optimum space usage always two screen openings 6 located opposite each other of adjacent rows have mirror contours.

Figure 6:
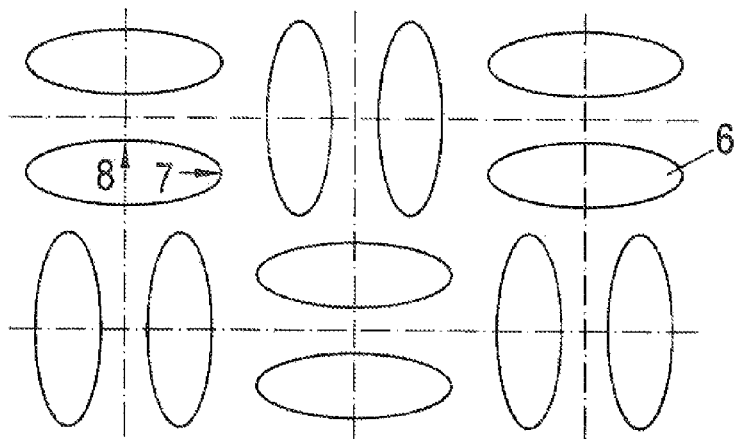

In contrast hereto, screen openings 6 in FIG. 6 are formed respectively by two long circle segments with large 8 radius and two short segments with small 7 radius. In this case too, large and small radii 7, 8 alternate in a circumferential direction of screen opening 6. To influence screen characteristics, elongated screen openings 6 are oriented differently on the screen surface. As an example, screen openings 6 in this case are arranged in pairs parallel adjacent to each other, whereby however screen openings 6 of adjacent pairs are oriented always perpendicular to each other.

Figure 7:
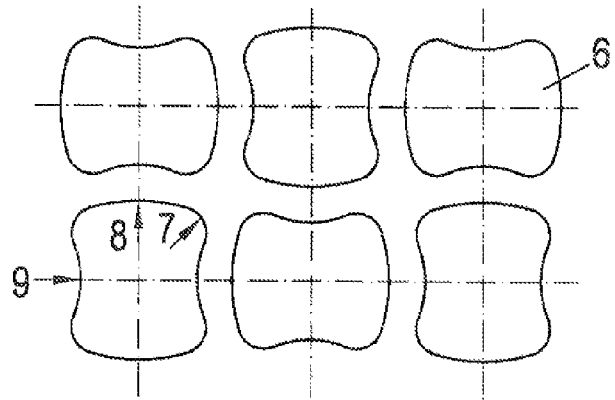

Screen openings 6 according to FIG. 7 are formed by four long circle segments with large radius 8,9 and four small circle segments with small radius 7. Here too, large radius 8, 9 follows small radius 7 however small radius 7 is arranged between two differently curved circle segments. Whereas a large circle segment progresses convexly curved relative to the center of the screen opening, the other is concavely curved.

If screen openings 6, as in this case, are arranged in a plurality of rows progressing parallel and perpendicular to each other, whereby convexly curved 8 circle segment is located opposite a concavely curved 9 circle segment of adjacent screen opening 6 then bridges of the same width can be realized between screen openings 6 which has a positive effect on the stability of the screen. Moreover this results in a very large open screen surface with high throughput.

Figure 8:
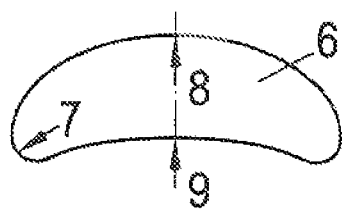
Figure 9:
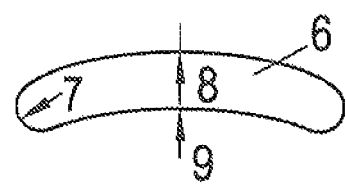

Screen openings 6 illustrated in FIGS. 8 and 9 are formed respectively by two short circle segments with small radius 7 and two long circle segments with large radius 8. A long circle segment relative to the center of screen opening 6 is thereby convexly curved and the opposite one is concavely curved. Whereas the long circle segments in FIG. 9 have the same center of circle, the radius in FIG. 8 of convex, long circle segment 8 is smaller than the radius of concave circle segment 9.

Figure 10:
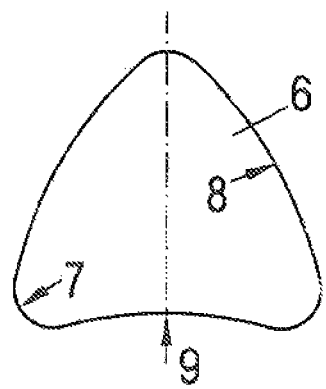
Figure 11:
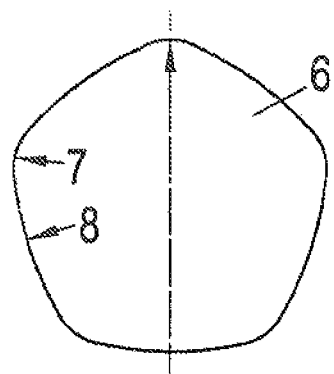

Screen openings 6 according to FIG. 10 have three short convex circle segments with small radius 7, two long circle segments with large radius 8 which, relative to the center of screen opening 6 progress convexly, as well as a long concave circle segment with large radius 9. In contrast FIG. 11 shows screen opening 6, consisting of five short convex circle segments with small radius 7 and five long convex circle segments with large radius 8. Because of the curved opening edges of screen openings 6 shown in all examples, the pulping effect can be substantially improved when coinciding with rotor vanes 4 which are moved closely to them. Added to this is that passing through of large rigid components can be impeded. The pulping effect can moreover be improved by an appropriate orientation of screen openings 6.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pulper for comminuting and suspending a fibrous material, the pulper comprising:
   a vat;
   at least one rigid screen with a screen surface having a plurality of screen openings, each of said screen openings defined by at least one first arc having a first radius and at least one second arc having a second radius, said first radius being greater than said second radius, said at least one first arc tangentially adjoining said at least one second arc, thereby defining a bounded curve, each of said plurality of screen openings being rotated in its orientation relative to each adjacent screen opening; and
   at least one rotor arranged in said vat for circulating a fibrous stock suspension, said rotor passing over at least a greatest portion of the screen surface of said at least one rigid screen.

2. The pulper according to claim 1, wherein said at least one first arc has a first arc length and said at least one second arc has a second arc length, said first arc length being greater than said second arc length.

3. The pulper according to claim 2, wherein said at least one first arc further comprises at least two first arcs, said at least one second arc further comprises at least two second arcs, said at least two first arcs and at least two second arcs alternating.

4. The pulper according to claim 3, wherein a ratio between said first radius and said second radius is between approximately 3 and 20.

5. The pulper according to claim 4, wherein said ratio between said first radius and said second radius is between approximately 5 and 15.

6. The pulper according to claim 4, wherein said second radius of said at least one second arc is between approximately 1.5 mm and 3 mm.

7. The pulper according to claim 4, wherein said first radius of said at least one first arc is between approximately 10 mm and 30 mm.

8. The pulper according to claim 1, wherein said circle segments said at least one first arc further comprises two first arcs and said at least one second arc further comprises two second arcs, said first arcs and said second arcs alternating.

9. The pulper according to claim 1, wherein aid at least one first arc further comprises three first arcs and said at least one second arc further comprises three second arcs, said first arcs and said second arcs alternating.

10. The pulper according to claim 1, wherein said at least one first arc further comprises four first arcs and said at least one second arc further comprises four second arcs, said first arcs and said second arcs alternating.

11. The pulper according to claim 1, wherein said at least one first arc further comprises five first arcs and said at least one second arc further comprises five second arcs, said first arcs and said second arcs alternating.

12. The pulper according to claim 1, wherein all of said plurality of screen openings of said screen surface of said at least one rigid screen have a shape which is the same.

13. The pulper according to claim 1, wherein said plurality of screen openings of said screen surface of said at least one rigid screen have shapes which alternate.

14. The pulper according to claim 1, wherein each of said plurality of screen openings of said screen surface of said at least one rigid screen have a shape which is the same and one of two proportionate sizes which alternate.

15. The pulper according to claim 1, wherein each of said at least one first arc and said at least one second arc defining said screen openings is convex such that said bounded curve is entirely convex.

16. The pulper according to claim 1, wherein at least one of said at least one first arc and said at least one second arc defining said screen openings is concave such that said bounded curve is not entirely convex.

17. The pulper according to claim 16, wherein said at least one concave arc is at least one of said at least one first arcs defining said screen openings.

18. The pulper according to claim 17, wherein said at least one concave arc is at least two of said at least one first arcs defining said screen openings.

19. The pulper according to claim 18, wherein said at least one concave arc further comprises exactly two concave first arcs defining said screen openings, said two concave first arcs being located opposite each other.

20. The pulper according to claim 17, wherein said at least one concave arc further comprises exactly one concave arc.

21. The pulper according to claim 18, wherein one of said at least two concave first arcs has an arc length longer than another of said at least two concave first arcs.

22. The pulper according to claim 1, wherein said plurality of screen openings of said screen surface of said at least one rigid screen further comprise pairs of screen openings which are oriented the same, each of said pairs of screen openings being rotated in its orientation relative to each adjacent pair of screen openings.

23. The pulper according to claim 1, wherein said plurality of screen openings of said screen surface of said at least one rigid screen further comprise annular segments which are oriented differently.

24. The pulper according to claim 1, wherein each of said plurality of screen openings is rotated in its orientation relative to each adjacent screen opening by one of 90° and 180°.

25. The pulper according to claim 1, wherein a cross section of each of said plurality of said screen openings enlarges continuously in a flow direction of said fibrous stock suspension.

* * * * *